United States Patent
Dammert et al.

(10) Patent No.: US 6,866,933 B2
(45) Date of Patent: Mar. 15, 2005

(54) PIGMENTED CABLE JACKET COMPRISING COLOR PIGMENTS

(75) Inventors: Ruth Dammert, Stenungsund (SE); Magnus Nilsson, Göteborg (SE); Magnus Persson, Vänersborg (SE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/338,277

(22) Filed: Jan. 8, 2003

(65) Prior Publication Data

US 2003/0144390 A1 Jul. 31, 2003

(30) Foreign Application Priority Data

Jan. 9, 2002 (EP) .............................. 02000528

(51) Int. Cl.[7] .......................... C08L 23/04; H01B 9/00; H01B 11/00
(52) U.S. Cl. ...................... 428/378; 428/379; 428/375; 428/383; 385/100; 385/106; 525/240; 526/352
(58) Field of Search ................................ 428/378, 379, 428/375, 383; 385/106, 100; 525/240; 526/352

(56) References Cited

U.S. PATENT DOCUMENTS 6,329,054 B1 * 12/2001 Rogestedt et al. .......... 428/378
6,503,993 B1 * 1/2003 Huovinen et al. ........ 526/348.1

* cited by examiner

Primary Examiner—Robert D. Harlan
(74) Attorney, Agent, or Firm—Fay, Sharpe, Fagan, Minnich & McKee LLP

(57) ABSTRACT

The invention relates to a pigmented cable jacket comprising a polymer composition which comprises a multimodal polyolefin, preferably polyethylene, and pigment composition comprising a color pigment wherein a blend of said pigment composition and said polymer composition is showing an average diameter of spherulites as determined according to the dissolution-recrystallization method which is at most 50% lower, more preferred at most 30% lower and still more preferred at most 10% lower than the average diameter of spherulites in the non-blended polymer composition as determined according to the dissolution-recrystallization method.

Further, the invention relates to the use of a color pigment for the production of such a pigmented cable jacket comprising a polymer composition which comprises a multimodal polyolefin, preferably polyethylene, and a pigment composition comprising said color pigment wherein said pigment is a non-warping pigment and to the use of a multimodal polyolefin, preferably polyethylene, for the production of such a pigmented cable jacket comprising a polymer composition which comprises said multimodal polyolefin and a pigment composition comprising a color pigment wherein said pigment is a non-warping pigment.

37 Claims, 2 Drawing Sheets

PIGMENTED CABLE JACKET COMPRISING COLOR PIGMENTS

The present invention relates to a pigmented cable jacket comprising a polymer composition which comprises a multimodal polyolefin, preferably polyethylene, and a pigment composition comprising a colour pigment, to a process for the production of such a pigmented cable jacket wherein the cable jacket is produced by co-extrusion of said polymer composition and said pigment composition as well as to the use of a colour pigment for the production of a pigmented cable jacket comprising a polymer composition which comprises a multimodal polyolefin, preferably polyethylene, and a pigment composition comprising said colour pigment and to the use of a multimodal polyolefin, preferably polyethylene, for the production of a pigmented cable jacket comprising a polymer composition which comprises said multimodal polyolefin and a pigment composition comprising a colour pigment.

Cables, such as power cables or communication cables, usually comprise an inner core which comprises a conducting element, such as a metal wire or a glass fibre, and one or more outer layers for shielding and protecting purposes. The outermost of these layers having mainly protective purpose is usually referred to as cable jacket or oversheath.

It is known to produce cable jackets with polymer compositions comprising mainly polyolefins, more particular polyethylene. The diverse application fields for the various sorts of cables make it necessary that the cable jacket meets a number of requirements which at least partly are different or even contradictory to each other.

Among important properties of the material used as cable jacket are good processability, e.g. the material should be processable over a broad temperature range, immunity from environmental stress cracking and a low shrinkage of the final cable jacket.

In particular, it is known that high shrinkage of the jacketing material for example creates stresses in the fibres of fibre optical cables which in turn gives attenuation (transmission loss) in the cable. Furthermore, low longitudinal shrinkage is of great importance for the design of accessories for power cables because there is a risk that under heating the cable jacket may slip out of a protective covering thus leaving the accessory unprotected from the elements. As shown by these examples, low shrinkage is one of the most important properties for cable jackets.

It is further known to add pigments to a cable jacketing polymer composition in order to change the natural colour of the produced jacket. For example, it is known to add carbon black to a cable jacketing composition to produce a black cable jacket. Colouring of a cable jacket may be required due to safety purposes, e.g. to characterize the nature of the cable.

For pigmenting of conventional cable jackets based on unimodal polyolefin/polyethylene the use of all kinds of different pigments comprising inorganic and organic pigments is known. Furthermore, it is known that the particular nature of the pigment does not negatively influence the properties, in particular the shrinkage, of these conventional cable jackets.

Cable jackets comprising a multimodal polyolefin, in particular polyethylene, are known to have improved processing and mechanical properties such as low shrinkage, high mechanical strength, high surface finish and high environmental stress resistance. Such cable jackets are known e.g. from WO 97/03124 which is hereby incorporated by way of reference. It is thus desirable to produce coloured cable jackets comprising a multimodal polyolefin.

It has now, however, been found that in cable jackets produced with polymer compositions comprising a multimodal polyolefin the shrinkage is negatively affected by the incorporation of pigments which, in turn, negatively affects the protective properties of the cable jacket.

The present invention is therefore based on the finding that a negative influence on the shrinkage of a pigmented cable jacket comprising a polymer composition which comprises a multimodal polyolefin can only be avoided if particular pigments are used.

The present invention therefore provides a pigmented cable jacket comprising a polymer composition which comprises a multimodal polyolefin, preferably polyethylene, and a pigment composition comprising a colour pigment wherein a blend of said pigment composition and said polymer composition is showing an average diameter of spherulites as determined according to the dissolution-recrystallisation method which is at most 50% lower than the average diameter of spherulites in the non-blended polymer composition as determined according to the dissolution-recrystallisation method.

The term "non-blended polymer composition" designates the polymer composition comprising a multimodal polyolefin which has not been blended with the pigment composition.

In the inventive cable jacket a blend of said pigment composition and said polymer composition may also have an average diameter of spherulites as determined according to the dissolution-recrystallisation method which is higher than the average diameter of spherulites in the non-blended polymer composition as determined according to the dissolution-recrystallisation method.

Preferably, in the inventive pigmented cable jacket the blend of said pigment composition and said polymer composition is showing an average diameter of spherulites as determined according to the dissolution-recrystallisation method which is at most 30% lower, further preferred at most 10% lower than the average diameter of spherulites in the non-blended multimodal polyolefin as determined according to the dissolution-recrystallisation method.

Further preferred, in the pigmented cable jacket the blend of said pigment composition and said polymer composition average is showing a diameter of spherulites as determined according to the dissolution-recrystallisation method of 5 micron or more, preferably 10 micron or more and most preferably 15 micron or more.

Furthermore, the present invention provides a pigmented cable jacket comprising a polymer composition which comprises a multimodal polyolefin, preferably polyethylene, and a pigment composition comprising a colour pigment wherein said cable jacket if produced by co-extrusion of said polymer composition and said pigment composition at an extrusion temperature of 210° C. and a cooling temperature of 23° C. is having a shrinkage at 100° C./24 h which is at most 30% higher than the shrinkage at 100° C./24 h of a cable jacket produced by extrusion of the polymer composition only under equal conditions.

Preferably, the pigmented cable jacket is having a shrinkage at 100° C./24 h which is at most 20% higher, further preferred at most 10% higher than the shrinkage at 100° C./24 h of a cable jacket produced by extrusion of the polymer composition only.

Further preferred, the pigmented cable jacket is having a total shrinkage of 1.8% or less at 100° C./24 h, more preferred of 1.5% or less at 100° C./24 h and still more preferred of 1.2% or less at 100° C./24 h.

The present invention furthermore provides a pigmented cable jacket comprising a polymer composition which comprises a multimodal polyolefin, preferably polyethylene, and a pigment composition comprising a colour pigment wherein said pigment is a non-warping or low-warping pigment.

Further preferred, the pigment is a non-warping pigment.

Pigmented cable jackets according to any of these embodiments of the present invention show a shrinkage which does not negatively affect the protective purpose of the jacket. Thus, it is possible to produce cable jackets with different colours which benefit from the advantageous properties coming from their contents of a multimodal polyolefin without being negatively affected by the incorporation of pigments.

As in practice pigmented cable sheaths often contain more than one type of pigments, the present invention also includes that combinations, i.e. mixtures of different pigments, are used. These mixtures, however, must of course fulfill the requirements as set forth for the above described embodiments of the invention.

The features of any of the above described embodiments including their preferred features are preferred variants of all of the other embodiments.

In the following, some of the terms used for defining the subject matter of the invention are explained in more detail.

Spherulites are structures known to appear in polymers crystallized from the melt, having sphere-like appearance and diameters which usually lie in the range of 0.5 to 100 microns. For further explanations of this subject it is referred e.g. to D. C. Bassett, "Principles of Polymer Morphology", Cambridge University Press 1981 and A. E. Woodward, "Understanding Polymer Morphology", Hanser Gardner Publications, 1995. These documents hereby are incorporated by way of reference.

To determine the nature and size of the spherulites, a new method has been developed which is designated as "dissolution-recrystallisation method". This method is described in detail in the experimental section.

The shrinkage is determined after extrusion of a cable sample at 210° C. The measurement of the shrinkage is described in detail in the examples section.

Warping is a phenomenon which occurs in pigmented injection moulded articles made from high density polyethylene, and designates deformation of such articles as a result from deterioration of their mechanical properties with time due to the incorporation of the pigment. Warping in general is tested by using a flat plate-shaped mold.

In the art, various pigments for colouring such articles are known which according to their behaviour in warping tests are classified into "warping", "low-warping" and "non-warping" pigments. The terms "warping", "low-warping" or "non-warping" pigment accordingly are intended to designate pigments which in high density polyethylene injection molded articles show warping, a low degree of warping or no warping, respectively.

The term "colour pigments" designates all pigments excluding carbon black, further preferred all pigments excluding black pigments and further preferred all pigments excluding black and white pigments.

The melt flow rate (MFR) of a polymer is determined in accordance with ISO 1133, at 190° C. at the loads indicated as subscript.

The following description and preferred features of the inventive cable jacket relate to all of the above described embodiments of the cable jacket.

The pigments used in the present invention may be of inorganic or organic nature.

Where possible, e.g. for red, yellow, orange and violet pigments, it is preferred that the pigment in the cable jacket is an organic pigment. Organic pigments are preferred from an environmental point of view because they do not contain heavy metals. Furthermore, organic pigments show a high colour strength, bright shades and high saturation.

Red, yellow, orange and violet pigments for the pigmented cable jacket may be chosen from the group of pigments PY 168, PY 93, PY 95, PY 199, PY 191:1, PY 120, PY 180, PY 181, PY 191, PY 62, PO 71, PO 64, PO 72, PR 220, PR 177, PR 53:1, PR 272, PR 254, PR 48:3, PR 57:1, PR 202, PR 122, PR 48:2, PR 170, PR 247, PR 247:1, PV 19, and PV 37 in low-warping or non-warping form.

In particular, red, yellow, orange and violet pigments for the pigmented cable jacket may be chosen from the group of pigments PY 168, PY 93, PY 95, PY 199, PY 191:1, PR 220, PR 177 in non-warping form.

Blue and green pigments for the pigmented cable jacket may be chosen from the group of pigments PB 29, PB 28, PB 36, PG 17, PG 19, PG 26 and PG 50 in low-warping or non-warping form.

In particular, blue pigments of the ultramarine-type may be used (PB 29) due to their environmental compatability.

As outlined above, also mixtures of any of these pigments may be used.

The abbreviations given for the preferred pigments, e.g. PR 177, refer to the classification of pigments in the *Colour Index* (CI), published by the Society of Dyers and Colourists, and the American Association of Textile Chemists and Colourists. In this Colour Index, the generic name and chemical constitution are listed for each pigment, e.g. pigment PR 177 is Pigment Red 177, an anthraquinone pigment obtained by bimolecular debromination of 1-amino-4-bromoanthraquinone-2-sulphonic acid, followed by desulfonation.

As polymer compositions comprising a multimodal polyolefin in the inventive cable jacket such as described in WO 97/03124 are preferred. This document hereby is incorporated by way of reference.

The polyolefin, preferably polyethylene, which forms part of the cable jacket is a multimodal polyolefin. Further preferred, the multimodal polyolefin is a bimodal polyethylene.

The expression "modality of a polymer" refers to the form of its molecular weight distribution (MWD) curve, i.e. the curve indicating the polymer weight fraction as a function of its molecular weight. If the curve exhibits one maximum, the polymer is referred to as "unimodal", whereas if the curve exhibits a very broad maximum or two or more distinct maxima and the polymer consists of two or more fractions, then the polymer is referred to as "bimodal" or "multimodal", respectively.

For example, if the polymer is produced in a sequential step process e.g. by utilizing reactors coupled in series and using different conditions in each reactor, in the different reactors different polymer fractions will be produced with each having its own molecular weight distribution which may considerably differ from one another. The molecular weight distribution curve of the resulting final polymer can then be looked at as the superposition of the molecular weight distribution curves of the polymer fractions which will accordingly show two or more distinct maxima or at least be distinctly broadened compared with the curves for the individual fractions.

Multimodal polymers can be produced according to several processes which are described e.g. in WO 92/12182.

The multimodal polyolefin preferably is produced in a multi-stage process in a multi-step reaction sequence such as described in EP 040 992, EP 041796, EP 022 376 and WO 92/12182, most preferably in a process as described in WO 92/12182. These documents hereby are included by way of reference.

These multi-stage processes require at least two main polymerisation stages which can be carried out under liquid, slurry or gas phase conditions. Preferred combinations of reaction conditions in the main polymerisation stages are slurry/gas-phase and gas-phase/gas-phase. Polymerisation in slurry phase preferably is carried out in a loop reactor.

In a preferred process for the production of bimodal polyethylene, in a first step ethylene is polymerized in slurry, preferably in a loop reactor, in the liquid phase of an inert low-boiling hydrocarbon medium. Then, the reaction mixture after polymerisation is discharged from the reactor and at least a substantial part of the inert hydrocarbon is separated form the polymer. The polymer is then transferred in a second or further step to one or more gas-phase reactors where the polymerization is continued in the presence of gaseous ethylene.

The multimodal polymer produced according to these multistage processes has a superior homogeneity with respect to the distribution of the different polymer fractions which cannot be obtained e.g. by a polymer mix.

The catalyst for the production of the olefin polymer may comprise a chromium, Ziegler-Natta or single-site catalyst.

It is preferred that the final multimodal olefin containing polymer composition is having a density of 0.915 to 0.955 g/cm$^3$, further preferred of 0.920 to 0.950 g/cm$^3$ and a MFR$_2$ of 0.1 to 3.0 g/10 min, further preferred of 0.2 to 2.0 g/10 min.

The multimodal polyethylene comprises a low molecular weight (LMW) ethylene homo- or copolymer fraction and a high molecular weight (HMW) ethylene homo- or copolymer fraction.

Depending on whether the multimodal ethylene polymer is bimodal or has a higher modality, the LMW and/or HMW fraction may comprise only one fraction each or two or more subtractions. The expression "ethylene homopolymer" as used herein refers to an polyethylene that consists substantially, i.e. to at least 97% by weight, preferably at least 99% by weight, more preferably at least 99.5% by weight and most preferably at least 99.8% by weight of ethylene units.

Preferably, the ethylene polymer is a bimodal polymer consisting of one LMW fraction and one HMW fraction.

It is further preferred that the ethylene polymer comprises an ethylene polymer fraction selected from (a) a LMW ethylene polymer having a density of 0.930–0.975 g/cm$^3$, more preferably from about 0.950–0.975 g/cm$^3$, and an MFR$_2$ of 50–5000 g/10 min, more preferably of 100–1000 g/10 min, and most preferred of 200–600 g/10 min, and (b) a HMW polymer having a density of 0.880–0.930 g/cm$^3$, more preferably of 0.910–0.930 g/cm$^3$ and an MFR$_2$ of 0.01–0.8 g/10 min, more preferably of 0.05–0.3 g/10 min.

Thus, the low molecular weight ethylene polymer preferably is a high density type polyethylene (HDPE) and the high molecular weight ethylene polymer is a linear low density type polyethylene (LLDPE). Preferably, the ethylene polymer comprises both fractions (a) and (b).

At least one fraction of the ethylene polymer preferably is a copolymer which was polymerized with a $C_3$–$C_{12}$ alpha-olefin, preferably with at least one comonomer selected from the group consisting of propylene, 1-butene, 4-methyl-1-pentene, 1-hexene and 1-octene. Preferably, the amount of comonomer in the ethylene polymer is 0.02–5.0 mol %, more preferably 0.05–2.0 mol %.

Preferably, the LMW fraction is an ethylene homo- or copolymer which has been produced with a moderate or small addition of comonomer. Further preferred, the HMW fraction of the polyethylene is a copolymer which has been produced with a greater amount of comonomer.

Further preferred, the low molecular weight component is a homopolymer of ethylene and the high molecular weight component is a copolymer of ethylene with a comonomer selected from propylene, 1-butene, 4-methyl-1-pentene, 1-hexene and 1-octene.

Further, it is preferred that if the polyethylene is produced according to the above-described multi-stage process the LMW fraction is produced in the loop reactor and the HMW fraction in the gas-phase reactor.

The properties of the multimodal polyethylene can be adjusted by the ratio of the low molecular fraction and the high molecular fraction in the multimodal polyethylene.

Preferably, the ethylene polymer comprises 25–75% by weight, preferably 35–55% by weight of a low molecular weight ethylene polymer component, and 75–25% by weight, preferably 65–45% by weight of a high molecular weight ethylene polymer component.

Preferably, the pigment or mixture of pigments is blended with the polymer composition comprising a multimodal polyolefin in the form of a masterbatch, i.e. the pigment is "diluted" by mixing it with a polymer.

Usually, the masterbatch is a polymer composition, preferably comprising a polyethylene, in which the pigment is contained in an amount of at most 25 wt. %, preferably of at most 20 wt. % and still more preferred of at most 15 wt. %.

The masterbatch may further comprise other components such as inorganic compounds as e.g. $CaCO_3$.

The cable jacket according to the invention is preferably produced by co-extrusion of the polymer composition and the pigment composition.

EXPERIMENTAL

Dissolution-Recrystallisation Method

The dissolution-recrystallisation method comprises two steps, namely the preparation of the cable jacket sample and the microscopic analysis of the prepared sample.

1. Sample Preparation

Approximately 0.1 g material are cut from the cable jacket sample and added to a 250 ml E-flask. 50 ml of xylene and a magnetic stirrer are added.

The E-flask is put on a heating plate and the sample is dissolved in its entirety while stirring at a temperature so that the solvent is boiling.

Once the polymer is fully dissolved the flask is removed from the heater and 2–3 droplets of the solution are applied on a cover glass one at the time by a Pasteur pipette.

The cover glasses must be free from dust since dust may initiate crystallisation. Dust can be removed by washing of the glasses, prior to use, in the solvent used. The polymer film should be continuous but thin. Before further handling, the samples are left to let the solvent evaporate.

2. Microscopic Analysis

Before the analysis, the microscope is adjusted by a Köhler adjustment. The microscope conveniently is equipped by an ELWD objective (Extra Long Working Distance). In the present examples, a 40× ELWD objective was used. A polariser, an analyser and a lambda-plate are used to make the crystallites/spherulites visible. By using a lambda plate, the wavelength of the transmitted light can be altered to obtain a better visibility. The polariser was adjusted to obtain perpendicular alignment of the filters without the lambda plate.

The analyses are performed in a Linkam HotStage equipment. The cover glass with the thin polymer film is placed inside the centring ring in the HotStage apparatus, which then is placed on the microscope table. After adjusting the focus, the temperature program listed below is initiated. The course of events is followed in the microscope. During the temperature program, a small flow of nitrogen was led through the HotStage chamber to prevent oxidation of the sample. Photos are taken after the recrystallisation of the polymer composition is completed.

The following temperature program was used (dynamic crystallisation):

Melting phase: RT to 210° C. at a heating rate of 50° C./min
Isotherm: 210° C., 5 minutes
Cooling: 210 to 130° C. at a cooling rate of 20° C./min
Crystallisation: 130° C. downward at a cooling rate of 1° C./min

EXAMPLES

In the following, the present invention is further illustrated by way of examples with reference to the figures.

Figure 1:
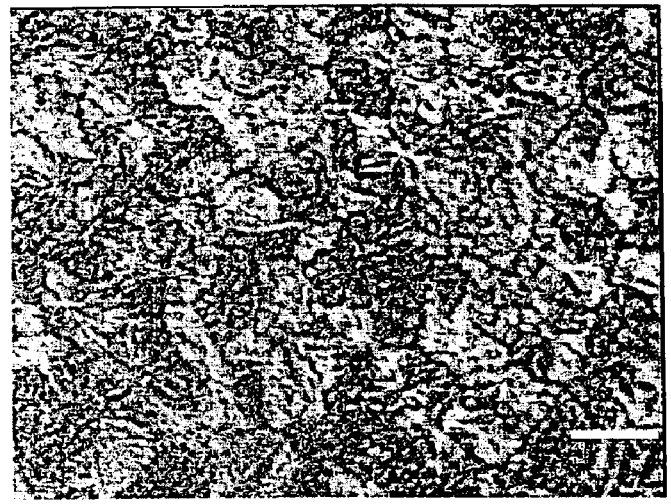
FIG. 1 shows the result obtained by the dissolution-recrystallisation method for a cable jacket comprising bimodal HDPE without pigment.

The white bar in the figures is indicating a length of 20 micron.

MFR was measured according to ISO 1133 at 190° C. with different loads indicated as subscript.

Density was measured according to ISO 1183-D and the samples are conditioned according to ISO1872-2.

1. Production of the Bimodal High-Density Polyethylene

The bimodal high-density polyethylene was produced in a polymerisation plant consisting of a loop reactor connected in series to a gas phase reactor and involving the utilisation of a Ziegler-Natta catalyst under the following conditions:

Loop Reactor

In this reactor, a first polymer was produced by the polymerisation of ethylene in the presence of hydrogen (molar ratio of hydrogen to ethylene was 0.38:1). The resulting ethylene homopolymer had an $MFR_2$ of 492 g/10 min and a density of 0.975 g/cm$^3$.

Gas Phase Reactor

In this reactor, a second polymer was produced by the polymerisation of ethylene and butene (molar ratio in the gas phase of butene to ethylene 0.22:1, of hydrogen to ethylene 0.03:1). The resulting copolymer was present in the form of an intimate mixture with the ethylene homopolymer from the first reactor the weight ration of the first and the second polymer being 45:55.

The density of the final bimodal HDPE was 0.942 g/cm$^3$, the $MFR_2$=0.45 g/10 min, $MFR_5$=1.75 g/10 min and $MFR_{21}$=37.9 g/10 min.

2. Preparation of the Pigment Masterbatch

The components PE (LLDPE, $MFR_2$=25, grained) in an amount of 70 wt. %, $CaCO_3$ in an amount of 20 wt. % and the pigment in an amount of 10 wt. % were premixed in a small plastic bag, then mixed on two-roll mill at ~150° C. for 10 minutes. The mixture then was chopped to reasonable small pieces.

The pigments used were: red pigment PR 220 (non-warping) and red pigment PR 254 (warping).

3. Preparation of Blends 1 wt. % of the pigment containing masterbatch was added, by dry blending, to the bimodal natural HDPE.

Furthermore, for comparison, also blends with a unimodal reference HDPE with a density 0.941 g/cm$^3$ and $MFR_5$=1.5 g/10 min, $MFR_{21}$=30 g/10 min were prepared similarly.

4. Cable Extrusion and Shrinkage Measurement

A pilot cable line with a 60 mm/24 D extruder was used for extruding a jacket of 1 mm thickness directly onto a 3 mm single aluminium conductor, using a semi-tube die. The extrusion conditions are given in Table 1.

Six cables have been extruded according to this procedure; three with bimodal HDPE and three with unimodal HDPE.

TABLE 1

| Conditions for cable extrusion | |
|---|---|
| Conductor | 3.0 mm solid, Al conductor |
| Wall thickness | 1.0 mm |
| Temperature, die | 210° C. |
| Distance between die and water bath | 100 cm |
| Temperature water bath | +23° C. |
| Line velocity | 75 m/min |
| Die type | Semi-tube |
| Nipple | 3.65 mm |
| Die | 5.9 mm |
| Screw design | Elise |
| Breaking plate | |

Shrinkage has been measured in percent after 24 h in a room with constant temperature (+23° C.) as well as after 24 h at a temperature of +100° C. Cable samples measuring approximately 40 cm are measured.

Conveniently, the cable sample is so marked that measurement after the conditionings can be carried out at the same point on the cable sample.

Should the cable be found to shrink during measurement, marks of about 40 cm first have to be made. Then, the length is cut and remeasured. Double samples are taken of each cable that is to be analysed. The samples are placed in the room with constant temperature for 24 h, whereupon they are measured, and the shrinkage in percent is then calculated.

All the samples are then placed on a talcum bed at +100° C. for 24 h. The samples are then measured, and the total shrinkage value in percent is calculated on the base of the initial length.

The results of the measurement are given in Table 2.

TABLE 2

| Results from shrinkage test | | | |
|---|---|---|---|
| Material | Pigment | Shrinkage (%) 23° C./24 h | Shrinkage (%) 100° C./24 h |
| Bimodal HDPE (comparative) | — | 0 | 1 |
| Bimodal HDPE | PR 220 (non-warping) | 0 | 1 |
| Bimodal HDPE (comparative) | PR 254 (warping) | 0.4 | 2 |
| Unimodal HDPE (comparative) | — | 0.6 | 1.8 |
| Unimodal HDPE (comparative) | PR 220 (non-warping) | 0.5 | 1.8 |

TABLE 2-continued

Results from shrinkage test

| Material | Pigment | Shrinkage (%) 23° C./24 h | Shrinkage (%) 100° C./24 h |
|---|---|---|---|
| Unimodal HDPE (comparative) | PR 254 (warping) | 0.6 | 1.8 |

The cable jackets comprising bimodal HDPE were also analysed according to the above-described dissolution-recrystallisation method.

Figure 2:
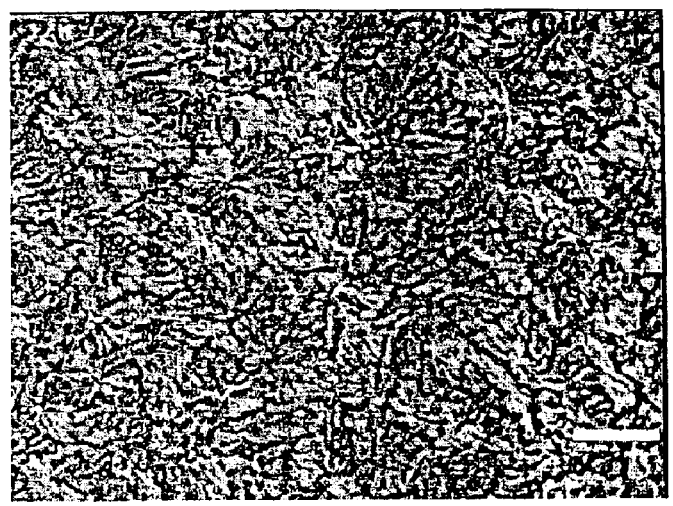
FIG. 2 shows the result obtained by the dissolution-recrystallisation method for a cable jacket comprising bimodal HDPE with non-warping pigment PR 220.
Figure 3:
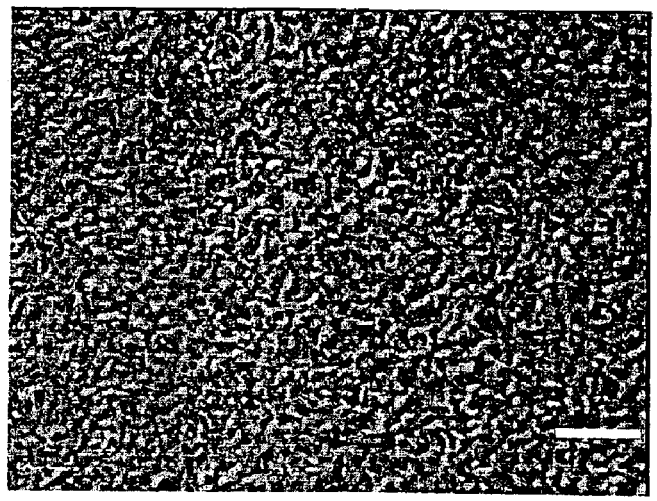
FIG. 3 shows the result obtained by the dissolution-recrystallisation method for a cable jacket comprising bimodal HDPE with warping pigment PR 254.

The results of these test are shown in FIGS. 1 to 3.

As can be seen from FIG. 1, the average diameter of the spherulites in the unpigmented cable jacket is 23 micron. The cable jacket produced with the pigment masterbatch comprising the non-warping pigment PR 220 shows spherulites with an average diameter of 21 microns (FIG. 2) which size accordingly is only 9% smaller compared to that in the unpigmented cable jacket.

In contrast, the cable jacket produced with the pigment masterbatch comprising the warping pigment PR 254 shows spherulites with an average diameter of less than 8 microns (FIG. 3) which size accordingly at least 65% smaller compared to that in the unpigmented cable jacket.

Thus, by the dissolution-recrystallization method pigments which do not negatively affect the shrinkage of the cable jacket can be easily selected.

What is claimed is:

1. A pigmented cable jacket comprising a polymer composition which comprises a multimodal polyolefin and pigment composition comprising a colour pigment wherein a blend of said pigment composition and said polymer composition is showing an average diameter of spherulites as determined according to the dissolution-recrystallization method which is at most 50% lower than the average diameter of spherulites in the non-blended polymer composition as determined according to the dissolution-recrystallisation method.

2. A pigmented cable jacket comprising a polymer composition which comprises a multimodal polyolefin and a pigment composition comprising a colour pigment wherein said cable jacket is produced by co-extrusion of said polymer composition and said pigment composition at an extrusion of 210° C. and a cooling temperature of 23° C. having a shrinkage at 100° C./24 h which is at most 30% higher than the shrinkage at 100° C./24 h of a cable jacket produced by extrusion of said polymer composition only under equal conditions.

3. A pigmented jacket comprising a polymer composition which comprises a multimodal polyolefin, and a pigment composition comprising a colour pigment wherein said pigment is a non-warping or low-waving pigment.

4. A pigmented cable jacket according to claim 1 wherein the average diameter of spherulites as determined according to the dissolution-recrystallisation method of said blend of said pigment composition and said polymer composition is 5 microns or more.

5. A pigmented cable jacket according to claim 1 wherein the jacket is having a total shrinkage of 1.8% or less at 100° C./24 h.

6. A pigmented cable jacket according to claim 1 wherein the multimodal polyolefin is a bimodal polyethylene.

7. A pigmented cable jacket according to claim 1 wherein the multimodal polyethylene has been produced in a multistage process.

8. A pigmented cable jacket according to claim 1 wherein said pigment is added as a masterbatch comprising at most 25 wt % of the pigment.

9. A process for the production of a pigmented cable jacket according to claim 1 wherein the cable jacket is produced by co-extrusion of said polymer composition and said pigment composition.

10. A process for the production of a pigmented jacket comprising blending a polymer composition which comprises a multimodal polyolefin, and a pigment composition comprising a colour pigment wherein said pigment is a non-warping pigment.

11. A process for the production of a pigmented jacket comprising blending a polymer composition according to claim 3 which comprises said multimodal polyolefin and a pigment composition comprising a colour pigment wherein said pigment is a low-warping pigment.

12. A pigmented cable jacket according to claim 2 wherein the average diameter of spherulites as determined according to the dissolution-recrystallisation method of said blend of said pigment composition and said polymer composition is 5 microns or more.

13. A pigmented cable jacket according to claim 2 wherein the jacket is having a total shrinkage of 1.8% or less at 100° C./24 h.

14. A pigmented cable jacket according to claim 2 wherein the multimodal polyolefin is a bimodal polyethylene.

15. A pigmented cable jacket according to claim 2 wherein the multimodal polyethylene has been produced in a multistage process.

16. A pigmented cable jacket according to claim 2 wherein said pigment is added as a masterbatch comprising at most 25 wt % of the pigment.

17. A process for the production of a pigmented cable jacket according to claim 2 wherein the cable jacket is produced by co-extrusion of said polymer composition and said pigment composition.

18. A pigmented cable jacket according to claim 3 wherein the jacket is having a total shrinkage of 1.8% or less at 100° C./24 h.

19. A pigmented cable jacket according to claim 3 wherein the multimodal polyolefin is a bimodal polyethylene.

20. A pigmented cable jacket according to claim 3 wherein the multimodal polyethylene has been produced in a multistage process.

21. A pigmented cable jacket of claim 1 wherein the average diameter of spherulites is at most 30% lower than the average diameter of spherulites in the non-blended polymer composition.

22. A pigmented cable jacket of claim 1 wherein the average diameter of spherulites is at most 10% lower than the average diameter of spherulites in the non-blended polymer composition.

23. A pigmented cable jacket of claim 2 wherein the shrinkage at 100° C./24 h is at most 20% higher than the shrinkage at 100° C./24 h of a cable jacket produced by extrusion of said polymer only under equal conditions.

24. A pigmented cable-jacket of claim 2 wherein the shrinkage at 100° C./24 h is at most 10% higher than the shrinkage at 100° C./24 h of a cable jacket produced by extrusion of said polymer only under equal conditions.

25. A pigmented jacket according to claim 3 wherein said polyolefin is polyethylene.

26. A pigmented cable jacket according to claim 4 wherein the average diameter of spherulites is 10 microns or more.

27. A pigmented cable jacket according to claim 4 wherein the average diameter of spherulites is 15 microns or more.

28. A pigmented cable jacket according to claim 5 wherein the jacket is having a total shrinkage of 1.5% or less at 100° C./24 h.

29. A pigmented cable jacket according to claim 5 wherein the jacket is having a total shrinkage of 1.2% or less at 100° C./24 h.

30. A pigmented cable jacket according to claim 8 wherein said pigment is added as a masterbatch comprising at most 15% of the pigment.

31. A pigmented cable jacket according to claim 12 wherein the average diameter of spherulites is 10 microns or more.

32. A pigmented cable jacket according to claim 12 wherein the average diameter of spherulites is 15 microns or more.

33. A pigmented cable jacket according to claim 13 wherein the jacket is having a total shrinkage of 1.5% or less at 100° C./24 h.

34. A pigmented cable jacket according to claim 13 wherein the jacket is having a total shrinkage of 1.2% or less at 100° C./24 h.

35. A pigmented cable jacket according to claim 16 wherein said pigment is added as a masterbatch comprising at most 15% wt % of the pigment.

36. A pigmented cable jacket according to claim 18 wherein the jacket is having a total shrinkage of 1.5% or less at 100° C./24 h.

37. A pigmented cable jacket according to claim 18 wherein the jacket is having a total shrinkage of 1.2% or less at 100° C./24 h.

* * * * *